2,864,735

NEMATOCIDAL CYCLOPARAFFIN COMPOSITIONS AND METHOD OF USING SAME

Roy E. Stansbury and Lyle D. Goodhue, Bartlesville, Okla., assignors to Phillips Petroleum Company, a corporation of Delaware No Drawing. Application January 2, 1952
Serial No. 264,646

10 Claims. (Cl. 167—22)

This invention provides a method for rendering soils nematocidal in character, employing selected cycloparaffins for this purpose. In one aspect this invention relates to a nematocidal composition comprising a cycloparaffin having 3 to 8 carbon atoms to the molecule. In another aspect the invention relates to a nematocidal composition containing such a cycloparaffin in a major or predominant proportion.

Nematodes are a class of unsegmented worms belonging to the phylum Nemathelminthes. Somes species of this class of worms such as the root-knot nematode *Heterodera marioni* infest soil in which crops are planted and attack said crops and cause considerable damage thereto.

We have now discovered that selected cycloparaffins are highly effective materials for the treatment of soils for the control of harmful nematodes found therein. We have further found that cycloparaffins are active carriers for other nematocides and contribute markedly to the nematocidal efficacy of compositions into which they are incorporated.

The selected cycloparaffins applicable to use in the present invention contain from three to eight carbon atoms in the ring which can be substituted with alkyl groups. Total carbon atoms shall not exceed 15. Typical compounds applicable to use according to the present invention include cyclopentane, methylcyclopentane, dimethylcyclopentane, cyclohexane, methylcyclohexane, cyclooctane, and the like. These materials can be used in accordance with the teachings of the present invention as pure compounds or as concentrates thereof containing at least 50 mol percent of the selected cycloparaffin.

Fumigation of soil using the cycloparaffins disclosed hereinabove can be carried out readily in a number of ways. For example, measured amounts of a selected cycloparaffin or mixture of selected cycloparaffins can be injected at regular intervals beneath the surface of the soil either by automatic machinery or by hand operated apparatus known in the art. These materials are usually deposited at a depth of from 3 inches to 8 inches below the surface of the soil, depending upon the character, moisture content, temperature, and other properties of the soil at from 8-inch to 12-inch intervals, although in some instances intervals as great as 15 inches may be used if desired. These materials are used at a rate of from 10 gallons, or somewhat less, to 55 gallons or somewhat more, per acre. The actual amount used in any given instance will depend to some extent upon the type and condition of the soil fumigated, and the condition of the pests to be controlled. When fumigating soil containing undecomposed plant material infested with galls of the root-knot nematode, it is frequently advisable to use as much as 75 gallons or more of a cycloparaffin or mixture of cycloparaffins per acre.

Use of the cycloparaffins disclosed above in accordance with the present invention provides advantageous soil fumigation characterized by low cost and a high degree of effectiveness at temperatures in which nematodes are most susceptible. Use of said cycloparaffins provides the further advantage in nematode control of rapid permeation of soil with resultant quick kill of nematodes contained therein.

The cycloparaffins used in the present invention are applicable to the destruction of the root-knot nematode *Heterodera marioni, Rhabditis strongyloids*, Panagrellus, and others.

It is within the scope of the present invention to employ cycloparaffins as herein disclosed as active carriers for other nematocides such as ethylene bromide, ethylene chloride, methyl bromide, carbon disulfide, dichloropropene, chlorobromopropene, chloropicrin, ethylenechlorobromide, dichlorodiethyl ether, and others, as well as mixtures thereof. Accordingly, highly efficacious nematocidal compositions are prepared by admixing a cycloparaffin as hereinabove disclosed with another nematocide or mixture of other nematocides. Mixtures containing from 99 to 50 percent by weight of a cycloparaffin or cycloparaffin concentrate and from one to 25 percent by weight of other nematocide are easy to formulate and are convenient to apply to the soil. Such compositions can be employed to fumigate soil by injection methods or the like as disclosed above and are applied to the soil at a suitable rate to control undesired nematodes and found therein.

EXAMPLE I

It is the opinion of nematologists that a good nematocide should be volatile, very slightly soluble in water and should be able to penetrate nemic membranes. The stender[1] dish fumigation test, employed in the laboratory to test the properties described above, consists of placing nematodes in a very small drop of water in a B. P. I. (Bureau of Plant Industries) watch glass[2]. The B. P. I. watch glass is then placed in a stender dish that is 60 mm. in diameter and 28 mm. in height. A measured amount of the nematocide is then placed in the stender dish beside the watch glass and the dishes covered. To kill the nematodes the chemical must first volatilze, then penetrate the water barrier and the nematodes.

A series of tests was run to demonstrate the nematocidal action of the cycloparaffins of the present invention against the adult male of the root-knot nematode *Heterodera marioni*. One-tenth milliliter of a candidate cycloparaffin was used and mortality counts were made after two hours. Results are recorded in the following table.

| Cycloparaffin | Ml. of cyclo-paraffin per dish | Percent of Nematodes dead in 2 hours |
|---|---|---|
| Cyclopentane | 0.1 | 100 |
| Methylcyclopentane | 0.1 | 100 |
| Cyclohexane | 0.1 | 99 |
| Commercial cyclohexane (85 mol percent). Probable impurities: 2,2,3-trimethylbutane, 2,4-dimethylpentane, and 2,2-dimethylpentane | 0.1 | 44 |

[1] A small dish having a plate glass cover, ground for a vapor tight fit.
[2] Small Syracuse pattern watch glasses approximately 1 inch in diameter.

EXAMPLE II

The stender dish test described in Example I was employed to test the nematocidal activity of cycloparaffins of the present invention against larvae of the root-knot nematode *Heterodera marioni*.

The tests were set up and the nematodes in the B. P. I. watch glass were observed after 2, 4, 7, and 22 hours had elapsed. If the nematodes appeared dead the lid was removed and a notation of the hour it was removed was made. If after 7 hours the nematodes were not all dead, the percent dead was noted and the lid was removed. On the 22 hours count it was determined if any of the larvae had revived or if some that were moribund had died. In recording the percentage dead, the amount dead when the lid was removed was recorded. In subsequent recordings if the number was the same a + mark was recorded. If more had died or some had revived the percentage was recorded.

Results of tests employing larvae of the root-knot nematode *Heterodera marioni*[1] less than 24 hours old are recorded in the following table.

[1] Larvae of the root-knot nematode are considered harder to kill than the adults.

*Stender dish fumigation test against root-knot nematode larvae Heterodera marioni*

| Cycloparaffin | Percent Dead at 0.1 ml./dish dosage at— | | | |
|---|---|---|---|---|
| | 2 hrs. | 4 hrs. | 7 hrs. | 22 hrs. |
| Cyclopentane | 52 / 0 | ------ / 100 | 88 / + | + / + |
| Cyclohexane | 0 | ------ | 92 | + |

EXAMPLE III

A further series of tests were run to demonstrate the nematocidal activity of cycloparaffins when used as aqueous emulsions. The candidate materials were formulated into 2 weight percent aqueous emulsions by employing 0.5 weight percent of Atlox 1045A (polyoxyethylene sorbitol oleate-laurate emulsifying agent) as emulsifier. Check tests proved that Atlox 1045A was non-toxic to the test organism, *Rhabditis strongyloids*. The two weight percent emulsions were then diluted so that in the end there were 4 concentrations: 2.0, 0.2, 0.02 and 0.002 percent. 1 ml. of distilled water was placed in a 3 mm. x 3 inch test tube and from 25 to 50 nematodes of the species *Rhabditis strongyloids* were then transferred to the test tube with a bamboo pick. To 1 ml. of water in the test tube containing the nematodes, 1 ml. of one of the concentrations of a candidate cycloparaffin emulsion prepared as described above was added. This procedure was repeated for the 3 other concentrations of the material. Since this was a 50/50 dilution the final concentrations of the emulsions were 1.0, 0.1, 0.01 and 0.001. Each test tube was stoppered and agitated mechanically for a period of two hours. The nematodes were then allowed to settle to the bottom of the test tube and drawn off with a pipette. The nematodes were then placed in a Syracuse watch glass and the emulsion diluted to permit them to be counted. The watch glass was then set aside and a check made 18 to 20 hours later to confirm mortality counts. Results are recorded in the following tabulation:

*Nematocidal activity of cycloparaffins against Rhabditis strongyloids*

| Cycloparaffin | Percentage Mortality at Indicated Emulsion Concentration | | | |
|---|---|---|---|---|
| | 1.0% | 0.1% | 0.01% | 0.001% |
| Cyclooctane | 100 / 100 | 90 / 100 | 80 / 0 | 20 / 0 |
| Technical methylcyclopentane, 95 mol percent. (Principal impurity, approximately 3% n-hexane) | 100 / 100 | 100 / 100 | 0 / 70 | 0 / 0 |
| Technical methylcyclohexane, 95 mol percent. Most probable impurities, toluene and ethylcyclopentane | 100 / 100 | 100 / 100 | 99 / 20 | 0 / 0 |
| Cyclopentane | 100 / 100 | 100 / 100 | 0 / 0 | 0 / 0 |
| Cyclohexane | 100 / 100 | 100 / 100 | 0 / 0 | 0 / 0 |
| Commercial cyclohexane (80–85 mol percent. Probable impurities: 2,2,3-trimethylbutane, 2,4-dimethylpentane, and 2,2-dimethylpentane | 100 | 90 | 0 | 0 |
| Commercial methylcyclohexane (75 mol percent). Probable impurities: toluene and ethylcyclopentane | 96 / 100 | 96 / 98 | 0 / 0 | 0 / 0 |
| Commercial dimethylcyclopentane (60–65 mol percent. Probable impurities: 2-methylhexane and 3-methylhexane | 100 / 100 | 94 / 100 | ------ / 100 | ------ / 0 |
| Methylcyclopentane | 100 | 100 | 0 | 0 |
| Methylcyclohexane | 100 | 100 | 0 | 0 |

EXAMPLE IV

The emulsion test procedure described in Example III was repeated employing *Panagrellus redivivus* as the test organism. Results are recorded in the following table.

| Cycloparaffin | Percentage Mortality at Indicated Emulsion Concentration | | | |
|---|---|---|---|---|
| | 1.0% | 0.1% | 0.01% | 0.001% |
| Cyclopentane | 100 / 100 | ------ / 20 | ------ / 0 | ------ / 0 |

EXAMPLE V

A series of stender dish tests was run according to the method described in Example I to demonstrate the superiority of compositions made according to the present invention over compositions comprising a non-toxic carrier and a known nematocide, namely ethylene bromide. Compositions employed and results of fumigation tests against the root-knot nematode *Heterodera marioni* are recorded in the following table.

| No. | Composition | Ml. of Composition per dish | Percent of Nematodes dead in 2 hours |
|---|---|---|---|
| I | 50 wt. percent cyclopentane / 50 wt. percent ethylene bromide | 0.01 | 100. |
| II | 90 wt. percent cyclopentane / 10 wt. percent ethylene bromide | 0.01 | 80 (100% kill in 7 hours). |
| III | 99 wt. percent cyclopentane / 1 wt. percent ethylene bromide | 0.01 | (36% kill in 7 hours.) |
| IV | 50 wt. percent Stoddard solvent / 50 wt. percent ethylene bromide | 0.01 | 100. |
| V | 90 wt. percent Stoddard solvent / 10 wt. percent ethylene bromide | 0.01 | (52% kill in 6 hours.) |
| VI | 99 wt. percent Stoddard solvent / 1 wt. percent ethylene bromide | 0.01 | (No kill in 6 hours.) |

Ethylene bromide, 40% by weight in cyclopentane, was compared with ethylene bromide, 40% by weight in Stoddard solvent, against a natural population of nematodes (mostly root-knot) in soil. Field soil from a uniformly mixed lot was fumigated in units of one quart with the above compositions at different rates. After one week the living nematodes were removed from ½ pint samples and counted. The procedure for removing the nematodes is described by Christie in a paper published in the Proceedings of the Helminthological Society of Washington, vol. 18, No. 2, p. 106, 1951. In the following table of results the rates of application are given in terms of the amount per cubic foot of soil. These results show that the cyclopentane-ethylene bromide mixture is significantly more toxic than the Stoddard solvent-ethylene bromide mixture.

| Fumigant | Conc., percent | Solvent | Number Live Nematodes in ½ pt. soil, Rate per cubic foot | | | |
|---|---|---|---|---|---|---|
| | | | 0.0 ml. | 0.25 ml. | 0.5 ml. | 1.0 ml. |
| Ethylene bromide | 40 | Cyclopentane | | 46 | 2, 7 | 2 |
| Do | 40 | Mineral spirits | | 111 | 31, 21 | 5 |
| | | | 268 | | | |
| | | | 375 | | | |

In other tests mineral spirits or Stoddard solvent show no toxicity to nematodes when used alone.

Variation and modification are possible within the scope of the foregoing disclosure and the appended claims to the invention, the essence of which is that cycloparaffins as described have been found to be nematocidal in character.

We claim:

1. A composition of matter composed of soil rendered nematocidal and a cycloparaffin having 3 to 8 carbon atoms in the ring in an amount effective to render the said soil nematocidal in character.

2. A composition of matter composed of soil rendered nematocidal and in an amount effective to render the said soil nematocidal in character a composition of matter containing 99 to 75 weight percent of a cycloparaffin having 3 to 8 carbon atoms in the ring and one to 25 percent of at least one compound selected from the group consisting of ethylene bromide, methyl bromide, dichloropropene, chlorobromopropene, chloropicrin, ethylenechlorobromide, and dichlorodiethyl ether.

3. A method of rendering soil nematocidal in character which comprises innoculating said soil with a cycloparaffin having 3 to 8 carbon atoms in the ring in the amount effective to render said soil nematocidal in character.

4. A method according to claim 3 wherein there is dissolved in said cycloparaffin a minor yet effective proportion a nematocidal compound selected from the group consisting of ethylene bromide, ethylene chloride, methyl bromide, dichloropropene, chlorobromopropene, chloropicrin, ethylenechlorobromide, and dichlorodiethyl ether.

5. A method of fumigating soil against nematodes which comprises injecting into said soil at intervals beneath the surface thereof a nematocidal preparation containing a cycloparaffin having 3 to 8 carbon atoms in the ring in an amount sufficient to render said soil nematocidal in character.

6. A method according to calim 5 wherein up to about 25 percent by weight of the nematocidal preparation is composed of a compound selected from the group consisting of the following: ethylene bromide, ethylene chloride, methyl bromide, dichloropropene, chlorobromopene, chloropicrin, ethylenechlorobromide, and dichlorodiethyl ether.

7. A method of increasing the permeation of soil by a nematocidal composition of matter which comprises applying the same to said soil dissolved in a cycloparaffin having 3 to 8 carbon atoms in the ring.

8. A method of rendering soil nematocidal in character which comprises inoculating said soil with approximately 10–75 galloms per acre of at least one of the compounds selected from the group consisting of cyclopentane, methylcyclopentane, cyclophexane, methylcyclohexane, cyclooctane, and dimethylcyclohexane.

9. A method of rendering soil nematocidal in character which comprises inoculating said soil with approximately 10 to approximately 75 gallons per acre of a cycloparaffin having 3 to 8 carbon atoms in the ring.

10. A method of rendering soil nematocidal in character which comprises inoculating said soil with a cycloparaffin having 3 to 8 carbon atoms in the ring in an amount sufficient to render said soil nematocidal in character, said cycloparaffin being at least one of the compounds selected from the group consisting of cyclopentane, methylcyclopentane, cyclohexane, methylcyclohexane, cyclooctane, and dimethylcyclohexane.

References Cited in the file of this patent

UNITED STATES PATENTS

| 2,473,984 | Bickerton | June 21, 1949 |
| 2,606,857 | Dawson | Aug. 12, 1952 |
| 2,651,579 | Plump | Sept. 8, 1953 |

FOREIGN PATENTS

| 558,474 | France | May 25, 1923 |

OTHER REFERENCES

Chem. Abstracts, vol. 43 (1949), p. 4938.

Niefert et al.: U. S. D. A., Dept. Bull., No. 1313, pub. January 26, 1925, p. 3

Cupples et al: Art. in J. Econ. Ent., vol. 29, June 1936, pp. 613 and 614.

Slade et al.: Art. in Chem. and Ind.., October 13, 1945, pp. 314–319.

Jones et al.: Art. in Soap and San. Chem., p. 110, November 1945.

Frear: Chem of Insecticides, Fungicidies and Herbicides, 2nd ed., pp. 108–122, August 1948.

Brown: Insect Control by Chem., 1951, pp. 574–578.

Taylor: Agr. Chem., vol. 7, November 1952, p. 123.